United States Patent [19]

Dattatraya et al.

[11] Patent Number: 5,549,931
[45] Date of Patent: Aug. 27, 1996

[54] PROCESS FOR THE PREPARATION OF UNIFORM ULTRA THIN FILMS OF METAL OXIDE, METAL CHALCO-GENIDES AND METAL HALIDES

[75] Inventors: Sathaye S. Dattatraya; Patil K. Raghu; Paranjape D. Vinayak, all of Pune, Ind.

[73] Assignee: Council of Scientific & Industrial Research, New Delhi, Ind.

[21] Appl. No.: 394,595

[22] Filed: Feb. 27, 1995

[51] Int. Cl.$^6$ ........................................... B05D 3/02
[52] U.S. Cl. ..................... 427/376.2; 427/430.1; 427/435; 427/443.2; 264/570
[58] Field of Search ............... 427/430.1, 435, 427/443.2, 376.2; 264/570

[56] References Cited

U.S. PATENT DOCUMENTS

| | | | |
|---|---|---|---|
| 4,137,368 | 1/1979 | Miller | 428/461 |
| 4,138,276 | 2/1979 | Miller | 148/6.2 |
| 4,314,005 | 2/1982 | Aries | 428/467 |
| 5,135,780 | 8/1992 | Kissel | 427/404 |

*Primary Examiner*—Benjamin Utech
*Attorney, Agent, or Firm*—Ladas & Parry

[57] ABSTRACT

A process for the preparation of uniform and ultra-thin films of metal oxides, metal chalcogenides, or metal halides, which comprises of allowing to react interfacially, the two immiscible solutions prepared as mentioned hereinbelow.

(a) Preparing an aqueous solution containing cation/anion or species of corresponding elements, leading to the formation of metal oxides, chalcogenides or halides of which the film is desired;

(b) Preparing a solution of the appropriate cation or anion or species of the corresponding elements leading to formation metal oxides, chalcogenides, and halides; the film of which is to be prepared, in a volatile solvent which also facilitates the spreading of the solution on the aqueous solution prepared in step (a);

(c) Spreading the solution prepared in step (b) on the aqueous solution prepared in step (a) so as to form a film at the interface of aqueous and solvent solutions, evaporating the solvent, compressing the film formed at the interface laterally;

(d) Dipping a substrate in the solution and withdrawing it from the solution at a uniform rate to transfer the film on substrate surface;

The preparation and the deposition operations being effected at a temperature in the range of 10°–50° C., and (e) Crystallizing the films formed on the substrate by heating it at high temperature.

8 Claims, No Drawings

PROCESS FOR THE PREPARATION OF UNIFORM ULTRA THIN FILMS OF METAL OXIDE, METAL CHALCO-GENIDES AND METAL HALIDES

The present invention relates to an improved process for the preparation of ultra-thin films of metal oxides, halides, chalcogenides (i.e., sulphides, selenides. Tellurides). The thickness of the films prepared by the process of the present invention is in the range of 30–500 A. The films formed are useful in molecular electronics. The various applications of such films could be as electric capacitors, electrochromic films, corrosion resistant coatings, anti-reflection coatings, surface passivation coatings etc.

The conventional methods employed for the formation of thin/ultra-thin films are:

1. Sol—gelation method (sol-gel)
2. Vaccum Evaporative Technique (VE)
3. Glow Discharge Technologies (Sputtering)
4. Plasma processes
5. Chemical Vapour Deposition (CVD)
6. Electro plating
7. Spray Pyrolysis
8. Spin on method
9. Langmuir Blodgett Method (LB)

The abovementioned methods and their drawbacks are discussed below:

1. Sol-gel Method: Molecular or atomic conglomerates when stabilise in a suspended state in an aeous liquid is called sol. These conglomerates or suspensions can be destabilised to aggregated particles or homogeneous gel by changing the conditions of solvation or suspension in sols. If the said molecular or atomic conglomerates are desired to be deposited in the form of uniform films during gelation, a substrate, glass plate or quartz plate or the like is dipped in a sol and drawn out. A thin coating of gel is formed. The substrate is then dried. The heat treatment of substrate leads to oxide coating.

Drawbacks: The conditions of sol stabilisation and gelation are very critical. Also, thickness control is difficult. During the drying of gel and post deposition heat treatment, large volume changes bring about cracks in gel material and therefore it is difficult to get homogeneous, untracked films.

(2) Vacuum Evaporative Technologies:—The substance of which a thin/ultra-thin film is to be deposited is generated in vapour state by boiling, sublimating or vapourising by giving sufficient energy by heating, electron beam bombardment, lasers or any other energy sources. In the second step vapour is transported to substrate without any chemical change occurring in the substance and in the last step, the substance is allowed to condense/deposited on substrate surface such as glass/quartz plate, silicon wafer etc.

Drawbacks:—High vacuum is required. Some chemical changes in substance composition is quite common such as nonstoichiometry or contamination from source container. For the uniform and adherent films to be obtained, the number of parameters are large and therefore process monitoring and control is needed.

Molecular beam epitaxy which is an improved technology over vacuum evaporation is mainly used for growing single crystalline films (very ordered films) or single crystal substrates. The cost and number of parameters are increased many folds. The operation is complex and throughput is very low.

(3) Glow discharge technologies (Sputtering):—The ejection of surface aims from an electrode surface by momentum transfer from bombarding ion, is called sputtering. In other words during sputtering process source of electrode material in vapour state is made available, which is used for thin film formation as in vacuum evaporation. There are various ways in which basic process is modified.

AC sputtering, bias sputtering, magnetron sputtering are often used modifications.

Drawback:—The main drawback is contamination problem. Also, the equipment is sophisticated and very costly.

(4) Plasma Processes:—Some chemical reactions are accelerated in presence of bombarding reactive ions. Therefore, the electrode material (metal) in presence of gases like $O_2$, $N_2+H_2$, $CH_4$ forming a glow discharge forms a film of metal oxide, carbide, nitride on the substrate surface. The plasma can be generated by means of discharge in vacuum, electron bombardment, cyclotron resonance etc.

Drawback:—The drawback of this process is again high cost equipment. Also, limited number of reaction can be carried out and thin films formed by this method.

(5) Chemical vapour deposition (CVD):—In this method the constituents of vapour phase are made to react near or on the substrate surface where the solid product is obtained in thin film form. Since large number of reactions are available, CVD is versatile and flexible technique in producing variety of products (oxides, sulphides, selenides etc.) in thin film form including metals, semiconductors, insulators.

Metal organics are very convenient for CVD application as relatively low temperatures, can transform them in vapour phase, compared to pure inorganic compounds. This, therefore has become a main modification of CVD called MOCVD.

As a modification of CVD, other energy sources assistance is taken to carry out reactions by increasing the reaction rates. The lasers, photons (light) are utilised for this purpose.

Drawback:—Although the chemistry part of CVD appears ot be simple, the monitoring of many parameters is needed to achieve films of goods quality. The process, therefore, becomes technically complicated and critical. Also, thickness control of the films is difficult.

(6) Electroplating:—When a current is passed through a conducting solution (electrolyte) and suitable reactions are taking place at either cathode i.e., negative electrode or anode i.e., positive electrode, it is possible to employ this method in depositing thin films on conducting substrates. By controlling the pH, current density (current/area of electrode), temperature, composition of electrolyte it is possible to get uniform films of metals, some metal oxides, chalcogenides etc.

Drawbacks:—Films are obtained only on the conducting substrates. Also, the contamination is a common problem as many reactions can take place simultaneously.

(7) Spray pyrolysis:—The "atomised" droplets of a solution are sprayed on hot substrate where pyrolysis takes place, leading to a film on the substrate surface. Although versatile, this method is not useful for making ultrathin films.

(8) Spin-on-method:—In spin-on-method of depositing thin films, a drop of solution or sol is placed on rotating substrate. By centrifugal force the sol/solution is spread, on the surface of the substrate where the gelation reaction takes place as explained in the sol-gel technique. Further, heating the substrate converts the gel film into oxide film.

Drawback:—The method can be used only for specific application. Also, very thin films in the submicron range cannot be deposited by this method with uniformity and continuity.

(9) Langmuir Blodgett method:—In this method a known quantity ($1\times10^{-5}$ to $1\times10^{-4}$M) of a solution of film forming materials such as fatty acids $C_{n-1}$ $H_{2n-1}$ COOH or amines $C_2H_{2n+1}NH_2$ dissolved in volatile solvent such as benzene, chloroform, carbon tetrachloride etc, is delivered on a known area of clean water surface held in Langmuir trough (rectangular or circular) fitted with film pressure balance. These materials form monomolecular films at air— water interface, on lateral compression of the film with help of barrier or oil piston (such as oleic acid), condensed phase is obtained. If the soluble metal salts are added in aqueous subphase the cations/or (anions) get attached to the acid/(or subphase the cations/or (anions) get attached to the acid/(or amine) groups at the surface. The deposition of a monolayer on to a solid substrate such as glass plate, quartz plate, silicon wafer etc. is effected by introducing the substrate inside the aqueous subphase. For every withdrawal or dipping of the substrate one monolayer is deposited. Usually the dipping or withdrawal is effected under constant surface pressure (15 to 35 dynes/cm.). The nature and the amount of the species deposited from the aqueous subphase depends on deposition condition such as concentration, pH, rate of dipping and withdrawal, deposition pressure etc. By varying the deposition parameters the optimal condition for the deposition of metal ion is obtained. The deposited films are then thermally decomposed (500°–900° C.) to get stable ultrathin oxide films. The thickness of the film can be controlled by the number of monolayer deposited.

Drawbacks:—Only limited number of cation or anions could be brought in the film to react and to give desired product. Also, in the post deposition treatment, the long chain carbon containing part is to be removed mainly by burning. This leaves some chances of 'C' (carbon) contamination in the films. Also, the chemical reduction of the film material by carbon during heat treatment is possible.

The main object of the invention is to provide an improved and versatile method for preparation of ultrathin/ thin films.

Another object of the present invention is to provide an improved process for preparation of ultra thin films.

The principles by which the process of the present invention is developed is based on (1) The formation of an aqueous salt solution in the dilute concentration, 2) Formation of a solution of another salt in organic solvent which spreads on aqeous surface e.g., carbon tetrachloride, chloroform, benzene, n-hexane etc., 3) Choosing the salts in 1 and 2 such that they can react with each other in solution state and form a solid product. (4) Since the reaction takes place only on the surface of the aqueous phase, the solid product obtained can be in the form of a thin film and finally 5) A suitable method for transferring the thin film formed on the aqueous surface to the substrate surface.

Accordingly, the present invention provides an improved process for the preparation of ultrathin/thin films of metal oxides, chalcogenides, and metal halides on substrates such as glass, quartz plate or the like can be fully described in the following steps.

(a) Preparing an aqueous solution containing cation/ anion or species of corresponding elements, leading to the formation of metal oxides, chalcogenides or halides of which the thin film is desired, the solute concentration being in the range of $10^{-5}$ to $10^{-3}$M.

(b) Adjusting the pH of the solution in the ranged of 3 to 12, if necessary.

(c) Preparing a solution of the appropriate cation or anion or species, of the corresponding elements leading to formation metal oxides, chalcogenides, and halides, the film of which is to be prepared, in a volatile solvent which also facilitates the spreading of the solution on the aqueous solution prepared in step (a), the solute concentration being in the range of $10^{-5}$ to $10^{-3}$M.

(d) Spreading the solution prepared in step (c) on the aqueous solution prepared in step (a) so as to form a film at the interface of the aqueous and solvent solutions, evaporating the solvent, compressing the film formed at the surface literally with a constant compression pressure in the range of 18–35 dynes/cm.

(e) Dipping a substrate in the solution and withdrawing it from the solution at a uniform rate in the range of 0.5 to 1.5 cm/min. to transfer the film on substrate surface.

(f) The preparation and the deposition operations being effected at a temperature in the range of 10°–50° C.

(g) Heating the thin films for crystallisation at a temperature ranging between 500° to 800° C., if necessary.

The metal oxides used in the process of the invention may be selected from the oxides of Si, Ti, Al, V, Cr, Mn, Fe, Co, Ni, Cu, Zn, Zr Nb, Mo, Pd, Sn, In, Sb, Ba, Sr, La, Ta, W, Pb, Ce and their solid solutions.

The metal chaleogenides used in the process of the invention may be selected from Cu, Fe, Ni, Ga, In, Sn, Sb, Cd, Hg, etc. and their solid solutions.

The halides used in the process of invention may be selected from Ag, Hg, Cu, etc, and their solid solutions.

The organic solvent used in the process of invention may be selected from carbon tetrachloride, chloroform, benzene, n-hexane etc.

The evaporation of the solvent may be effected by natural evaporation, IR heating etc.

The substrates may be selected from glass plates, quartz plates, single crystal wafers of Si, Ge, $SrTiO_3$, $BaTiO_3$, $Al2O3$, plates, pellets of the compounds such as ZnO, $ZrO_2$, MgO, plates of $ZrO_2$, MgO etc.

The invention is illustrated by the examples given below which should not be construed to limit the scope of present invention.

EXAMPLE—I

A solution of potassium titanyl oxalate in a concentration of $3\times10^{-4}$ M, in double distilled water is prepared. The solution is contained in a teflon trough of $45\times15\times2$ cm. size. The solution is marked as 'A'.

A solution of $NH_3$ in carbon tetrachloride is prepared with a concentration of $1\times10^{-5}$ M. This solution is marked as 'B'. 0.2 ml of solution 'B' is spread on solution 'A' to form a liquid film. The film formed at the surface of aqueous solution is compressed laterally with the help of Oleic acid piston (pressure 30 dynes/cm.) after the evaporation of carbon tetrachloride.

A quartz plate $1\times1\times0.25$ cm was dipped in the solution with a rate 1 cm./min. and lifted out so that a dipped area is covered by the film. This operation is repeated fifty times, for increasing the thickness.

A film thus formed is heated to high temperature of 800° C. for 24 hours.

The film is characterised by X-ray diffraction and was determined to the $TiO_2$ (anatase) phase.

EXAMPLE—II

A solution of cadmium acetate in a concentration of $3\times10^{-4}$M. in double distilled water was prepared. pH was adjusted to 4 by HCl or acetic acid. The solution is contained in a teflon trough of 45×15×2 cm. size. This solution is marked as 'A'.

A solution of $H_2S$ in chloroform is prepared with the concentration of $1\times10^{-5}M$. This solution is marked as solution 'B'. 0.1 ml. of 'B' was spread on 'A' to form a liquid film on aqueous solution of cadmium acetate. $H_2S$ reacted with 'Cd' ions to form CdS film at the interface.

After all the chloroform was evaporated the film of CdS was compressed laterally with the help of oleic acid piston (pressure 30 dynes/cm.) and transferred on glass substrate of 1×1×0.25 cm. size, by dipping it into the solutions for 100 times to form the thin layer of film on the substrate.

The film thus formed is amorphous. It was crystallized by heating at 500° C. for 24 hours.

EXAMPLE—III

A solution of silver nitrate in a concentration of $3\times10^{-4}M$. in distilled water is prepared. The solution is contained in teflon trough 45×15×2 cm. size. The solution is marked as 'A'.

A solution of iodine in chloroform is prepared with the concentration of $1\times10^{-5}M$. This solution is marked as 'B'. 0.2 ml. of 'B' is spread on 'A' to form a film of silver iodide at the interface. The film formed was compressed laterally with the help of oleic acid piston (pressure 30 dynes/cm.) and transferred on silicon wafer size 1×1×0.2 cm. substrate by dipping it into the solutions for 75 times.

The main advantages of the present invention.

1. The method does not require any sophisticated equipment.
2. The method is low cost.
3. The method is very simple and the parameters can easily be monitored.
4. The thickness of the film prepared can be controlled.
5. Uniformity and adherence of the film prepared is good.
6. Large area deposition is possible.
7. The method is useful to deposit ultrathin films.

We claim:

1. A process of preparing films of metal oxides, metal chalcogenides, or metal halides, comprising;

(a) preparing an aqueous solution comprising cations, anions, or species capable of forming a metal oxide, metal chalcogenide, or metal halide, wherein the pH of said aqueous solution is in the range of 3 to 12, (b) preparing an organic solution comprising cations, anions, or species capable of combining in solution with said cations, anions, or species capable of forming a metal oxide, metal chalcogenide, or metal halide in step (a), wherein said organic solution comprises a volatile organic solvent, and is immiscible with said aqueous solution, (c) spreading said organic solution onto said aqueous solution so as to form a system having a film at the interface between said aqueous solution and said organic solution, (d) evaporating the volatile organic solvent, (e) applying a constant pressure to compress said system, (f) dipping a substrate into said system and withdrawing said substrate at a uniform rate to form a film on said substrate, (f) heating said substrate to crystallize said film formed on said substrate, wherein steps (a)–(e) are performed at a temperature in the range of 10° to 50° C.

2. The process of claim 1, wherein the solute concentration of the aqueous solution is in the range of $10^{-5}$ to $10^{-3}$ moles per liter.

3. The process of claim 1, wherein the solute concentration of the organic solution is in the range of $10^{-5}$ to $10^{-3}$ moles per liter.

4. The process of claim 1, wherein the constant pressure applied to compress said system is in the range of 18 to 35 dynes per centimeter squared.

5. The process of claim 1, wherein the substrate is a glass, a polymer, quartz or silicon.

6. The process of claim 1, wherein the substrate is dipped into the system and withdrawn at a rate in the range of 0.5 to 1.5 centimeters per minute.

7. The process of claim 1, wherein the substrate is heated at a temperature in the range of 500° C.–800° C. to crystallize said film formed on said substrate.

8. The process of claim 1, wherein the substrate is Ge, $SrTiO_3$, $BaTiO_3$, $Al_2\%$, ZnO, $ZrO_2$ or MgO.

* * * * *